US010867175B1

(12) United States Patent
Luo

(10) Patent No.: US 10,867,175 B1
(45) Date of Patent: *Dec. 15, 2020

(54) SIMULATION METHOD FOR DETECTING DIM ENVIRONMENT BASED ON VIRTUAL REALITY

(71) Applicant: Lesoft Technology (Beijing) Co., LTD., Beijing (CN)

(72) Inventor: Wei Luo, Shenzhen (CN)

(73) Assignee: LESOFT TECHNOLOGY (BEIJING) CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/729,469

(22) Filed: Dec. 29, 2019

(30) Foreign Application Priority Data

Dec. 24, 2019 (CN) .......................... 2019 1 1341283

(51) Int. Cl.
*G06K 9/00* (2006.01)
*G06K 9/46* (2006.01)
*G06K 9/40* (2006.01)
*G06T 19/00* (2011.01)
*G06K 9/62* (2006.01)

(52) U.S. Cl.
CPC ........... *G06K 9/00624* (2013.01); *G06K 9/40* (2013.01); *G06K 9/4609* (2013.01); *G06K 9/6201* (2013.01); *G06T 19/003* (2013.01)

(58) Field of Classification Search
CPC .... G06K 9/00624; G06K 9/40; G06K 9/4609; G06K 9/6201; G06F 3/011; G06T 7/00; G06T 11/00; G06T 19/003; G06T 19/006
USPC ....................................................... 345/419
See application file for complete search history.

(56) References Cited

U.S. PATENT DOCUMENTS

| 2009/0041302 | A1* | 2/2009 | Nagaoka ............ G06K 9/00369 382/103 |
| 2014/0028850 | A1* | 1/2014 | Keating .................. G06T 7/246 348/158 |
| 2015/0046483 | A1* | 2/2015 | Liu ...................... G06K 9/6215 707/758 |
| 2016/0004920 | A1* | 1/2016 | Armstrong-Crews ....................... G03B 35/00 348/46 |
| 2016/0357187 | A1* | 12/2016 | Ansari .................. G01S 13/862 |
| 2017/0249491 | A1* | 8/2017 | MacIntosh ......... G06K 7/10861 |
| 2018/0018770 | A1* | 1/2018 | Hu ............................ G06T 7/97 |
| 2018/0315221 | A1* | 11/2018 | Jones .................. G06F 16/5838 |
| 2019/0116350 | A1* | 4/2019 | Goto ..................... A63F 13/213 |

(Continued)

*Primary Examiner* — Sae Won Yoon
(74) *Attorney, Agent, or Firm* — Cheng-Ju Chiang

(57) ABSTRACT

Disclosed is a simulation method for detecting dim environment based on virtual reality, wherein by converting infrared detection images of each direction collected at each sampling point into a virtual detection space for automatically roaming in the virtual detection space to simulate a detection scene, the decision-makers can directly understand the actual situation of the target environment through the simulated virtual detection space without entering the scene, thereby making scientific decisions and reducing the probability of decision errors. And, in the disclosure, images can be acquired through infrared detectors, even for dim environments such as smoke and dust. Further, in the disclosure, it is only necessary to set an infrared detector at the sampling points of the detection path by a robot to collect the images, without the need for a detection personnel to enter or stay for a long time.

6 Claims, 3 Drawing Sheets

(56) References Cited

U.S. PATENT DOCUMENTS

| | | | |
|---|---|---|---|
| 2019/0272673 A1* | 9/2019 | Mathur | G06T 15/20 |
| 2020/0020162 A1* | 1/2020 | Jones | G06F 3/011 |
| 2020/0175842 A1* | 6/2020 | Merjanian | G06T 11/60 |
| 2020/0228836 A1* | 7/2020 | Schwarz | H04N 13/371 |

* cited by examiner

| Non-coincidence portion of image A | Coincidence portion between images A and B | Non-coincidence portion of image B |

SIMULATION METHOD FOR DETECTING DIM ENVIRONMENT BASED ON VIRTUAL REALITY

TECHNICAL FIELD

The disclosure relates to the technical field of environmental detection, in particular, to a simulation method for detecting dim environment based on virtual reality.

BACKGROUND

In the field detection, rescue, remote command, etc., the target environment is often required for detection, so as to understand the actual situation of the target environment and develop a targeted plan. However, the target environment is usually dim, and the detection personnel should not or cannot stay for a long time. In the prior art, the hand-held lighting equipment is manually used to enter the target environment for detection, but for dim environments with smoke, dust, etc., even the detection personnel who enters cannot clearly see the conditions of the target environment. Further, since only the incoming detection personnel knows the conditions of the target environment best and decision makers only have knowledge of the target environment that is often limited to the verbal description from the detection personnel, thereby leading large errors in decisions made by the decision makers.

SUMMARY

The technical problem to be solved by the disclosure is to provide a simulation method for detecting dim environment based on virtual reality, which may reproduce the actual conditions of the target environment through simulation, so that decision makers may understand the actual conditions of the target environment intuitively for making scientific decisions.

In order to solve the technical problem, the disclosure adopts the following technical solution:

A simulation method for detecting dim environment based on virtual reality includes steps of:

determining a detection path based on passage conditions of the detected dim environment;

collecting, by an infrared detector, infrared detection images of front, back, left, and right directions at each sampling point of detection path;

converting the infrared detection image of each direction collected at respective sampling point to a DOG scale-space corresponding to each direction;

detecting a key point of the DOG scale-space of each direction;

establishing a feature vector of the key point according to a position and a reference direction of the key point;

calculating a Euclidean distance between each key point according to respective feature vector of each key point to obtain a matched key point;

determining a coincidence region between infrared detection images of the four directions collected at each sampling point according to the matched key point;

combining infrared detection images of the four directions collected at each sampling point into a virtual detection image of sampling points according to the coincidence region;

converting the virtual detection image of each sampling point into a virtual detection space;

automatically roaming in the virtual detection space to simulate a detection scene.

Compared with the prior art, the disclosure has the following beneficial effects:

For the simulation method for detecting dim environment based on virtual reality of the disclosure, by converting infrared detection images of each direction collected at each sampling point into a virtual detection space for automatically roaming in the virtual detection space to simulate a detection scene, the decision-makers can directly understand the actual situation of the target environment through the simulated virtual detection space without entering the scene, thereby making scientific decisions and reducing the probability of decision errors. And, in the disclosure, images can be acquired through infrared detectors, even for dim environments such as smoke and dust. Further, in the disclosure, it is only necessary to set an infrared detector at the sampling points of the detection path by a robot to collect the images, without the need for detection personnel to enter or stay for a long time, so that the disclosure can be applied to a variety of complex detection environments.

DETAILED DESCRIPTION

Figure 1:
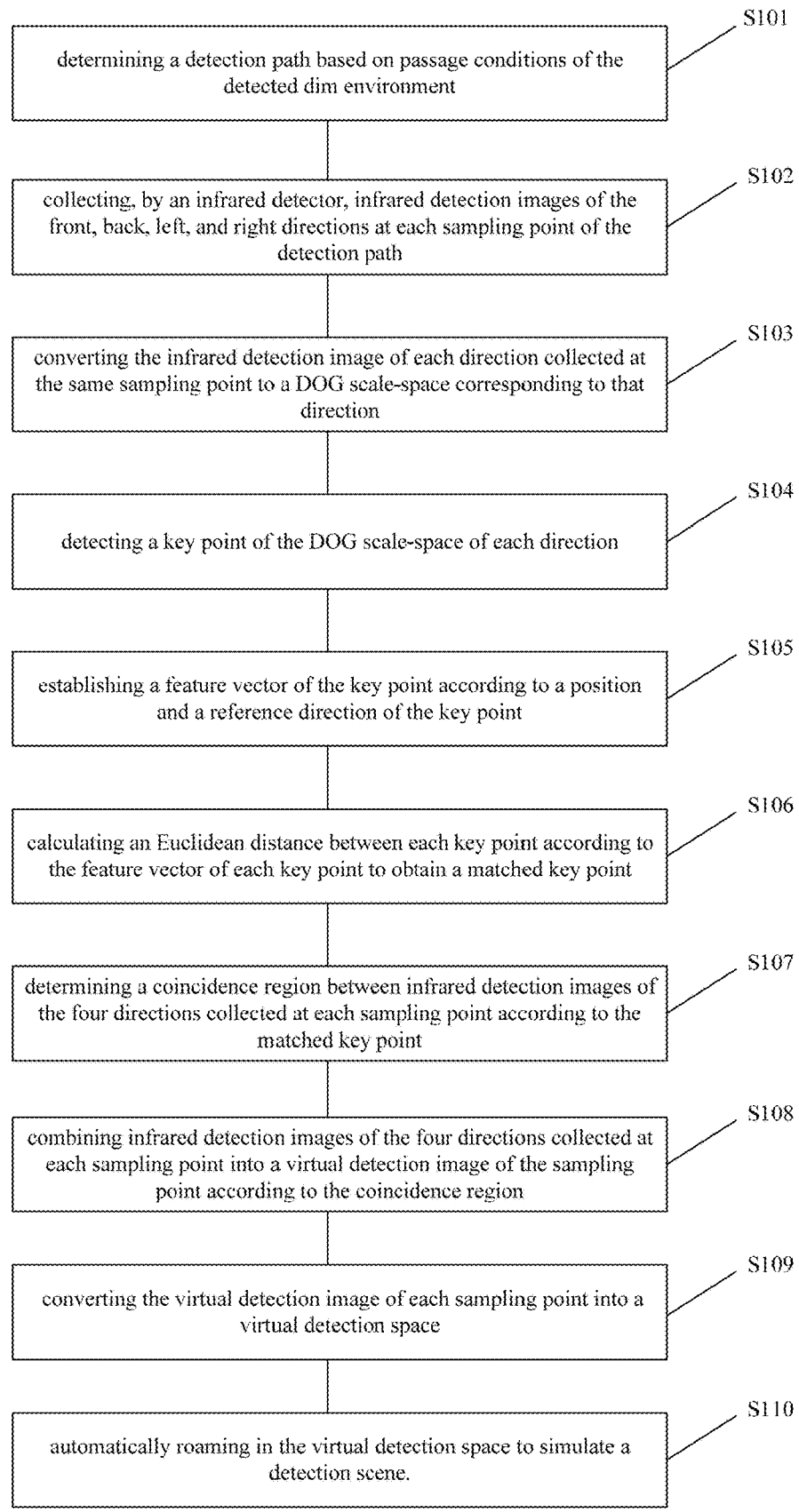
FIG. 1 is a flow chart of a specific embodiment of a simulation method for detecting dim environment based on virtual reality of the disclosure.
Figures 2, 3:
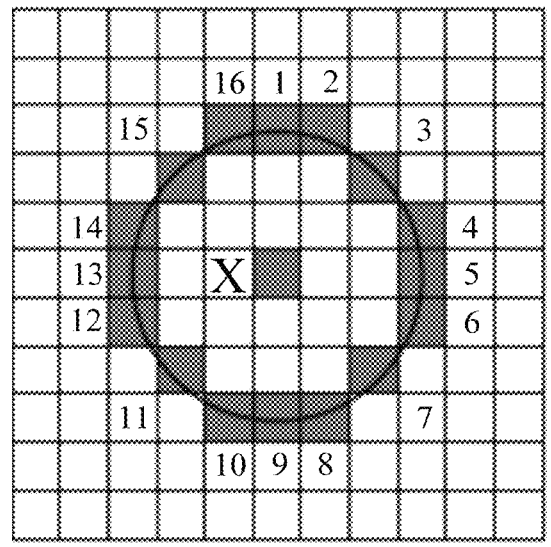
FIG. 2 is a view showing a specific embodiment of detection of a key point in a simulation method for detecting dim environment based on virtual reality of the disclosure.
FIG. 3 is a view showing a specific embodiment of a coincidence region in a simulation method for detecting dim environment based on virtual reality of the disclosure.

With reference to FIG. 1, a flow chart of a specific embodiment of a simulation method for detecting dim environment based on virtual reality of the disclosure is illustrated. The method of the present embodiment includes mainly steps of:

Step S101, determining a detection path based on passage conditions of the detected dim environment; specifically, for example, if a person should be rescued in a fired house and the target environment is a plurality of dim rooms, passage conditions may be determined based on the architectural design of the room, and the center line of the passage is determined as the detection path according to the passage conditions, so that the scope of the image collected by the detection path designed in this way is better, and in practice, the detection path may also be adjusted according to the detection purpose, which is not specifically limited here, and the passage conditions may be determined according to the actual situation, for example, if the target environment is a road, the detection path may be determined according to the road conditions in the map, while for some unknown target environments, the detection path may be also adjusted at any time during actual detection for recording and saving the detection path, which is not described here again;

Step S102, collecting, by an infrared detector, infrared detection images of the front, back, left, and right directions at each sampling point of the detection path; specifically, the infrared detector may be fixed at the sampling point by a detection robot or the infrared detector travels with the detection robot to collect images through the infrared detector when passing through the sampling point, and optionally, the infrared detector may be also manually disposed at the sampling point while evacuating the personnel after the disposition, which is not specifically limited here;

Step S103, converting the infrared detection image of each direction collected at respective sampling point to a DOG scale-space corresponding to each direction; specifically, there is at least one infrared detection image in each direction, and for each of the infrared detection images, in a specific embodiment, first Laplacian of Gaussian is performed on the infrared detection image to obtain a Laplacian of Gaussian image, then the Laplacian of Gaussian image is subtracted from its adjacent image, so as to obtain the DOG (Difference of Gaussian) scale-space;

Step S104, detecting a key point of the DOG scale-space of each direction; specifically, the existing method for detecting the key point is to treat a point as the detection point, and then to compare a total of 26 points, i.e., points around the point and 9 points in the upper layer and 9 points in the lower layer other than 8 points surrounded in the same layer, with the detection point, but the amount of computer calculation is large and time consuming when the above method is adopted. To this end, as shown in FIG. 2, according to a preferred embodiment of the disclosure, the following method is adopted:

first, selecting any pixel point in the DOG scale-space as a starting detection point;

then, using the starting detection point to make a circle with a radius of 3 pixels;

finally, determining a gray difference between the starting detection point and the pixels on a circumference numbered 1, 5, 9 and 13, determining the starting detection point as a candidate key point if a difference between the starting detection point and at least three of 1, 5, 9, and 13 is greater than a preset threshold, and then continuing the detection of the next detection point until all the pixels are detected to obtain all the key points. In the present embodiment, there is no need to compare the X point with 26 points as in the prior art, the calculation amount is greatly reduced, and the detection efficiency may be improved. Further, for detected candidate key points, the candidate key points may also be screened, and since the edge region has a sudden change in gray value in the vertical direction, it will be mistaken for a key point, so an edge response point should be removed from the candidate key points in the present embodiment in order to improve the stability of image matching;

Step S105, establishing a feature vector of the key point according to a position and a reference direction of the key point; specifically, for determined key points, the key points should be positioned to determine positions, such as performing three-dimensional quadratic function fitting to the determined key points so as to accurately determine the positions of the key points, and further, for determined key points, a reference direction should be assigned to the key points, which is specifically performed by assigning a reference direction to the key points based on the gradient direction of neighboring pixels, i.e., using histograms to count the gradients and amplitudes of pixels in the neighborhood, wherein the gradient direction angle is the horizontal axis scale, and the horizontal axis has 8 scales if 45 degrees is taken as a unit; the vertical axis is the cumulative value of the amplitude of the corresponding gradient, and the direction with the highest amplitude is taken as the reference direction to ensure the rotation invariance of the key points; finally, the feature vector of the key point is established, that is, a 16×16 window can be taken as the center of the key point, and the gradient direction histograms of 8 directions are calculated on the 4×4 window respectively, and a cumulative value of each gradient direction is drawn to form a seed point, each seed point having gradient intensity information in 8 directions; since there are 4×4 (Bp×Bp) subregions, there are 4×4×8=128 data in total, and a 128-dimensional feature vector corresponding to the key point is finally established;

Step S106, calculating an Euclidean distance between each key point according to respective feature vector of each key point to obtain a matched key point; specifically, the Euclidean Distance is the actual distance between two points in n-dimensional space, and in the present embodiment, the similarity of images is calculated using the Euclidean distance, wherein the smaller the Euclidean distance between two key points is, the greater the similarity is, then it is confirmed that the two key points are matching key points, which will not be repeated here;

Step S107, determining a coincidence region between infrared detection images of the four directions collected at each sampling point according to the matched key point; specifically, through the matching key points determined in the above step S106, it can further be determined that the region where the matching key points are located is the coincident region between the images, for example, the coincidence region of the image A and the image B in the two directions is shown in FIG. 3, and the coincidence regions between the images A and B and images of other directions may also be determined according to the matching key points, which will not be repeated here;

Step S108, combining infrared detection images of the four directions collected at each sampling point into a virtual detection image of sampling points according to the coincidence region; specifically, since the coincidence regions between the images have been determined, the images in the four directions are combined into a panoramic image according to the coincidence regions, i.e., slicing the infrared detection images in four directions into a cylindrical shape centered on the viewpoint, so that a 360-degree look around the horizon may be achieved, and in the present embodiment, there are at least four images in the four directions and a panoramic image may be obtained by slicing the images in the four directions according to the coincidence regions, and then the panoramic image is used as a virtual detection image of the sampling point;

Step S109, converting the virtual detection image of each sampling point into a virtual detection space; specifically, the step may be achieved by a virtual reality editor, and as an embodiment, for example, the virtual detection image of each sampling point may be used as a node of a map structure, and each node may establish a link relationship with other nodes to form the map structure, then viewers may roam between any two nodes with a link relationship;

Step S110, automatically roaming in the virtual detection space to simulate a detection scene; specifically, for example, since in above step viewers may roam between any two nodes with a link relationship, a decision maker in the disclosure may automatically watch through the virtual detection space for intuitively understanding the conditions of the target environment, and further, although it is possible to roam between two nodes in the present embodiment, optionally, an automatic roaming path corresponding to the detection path may be determined according to the detection path in order to be the same as the actual detection conditions, so that the virtual detection space displayed by automatic roaming may correspond to the real detection scene.

Figure 4:
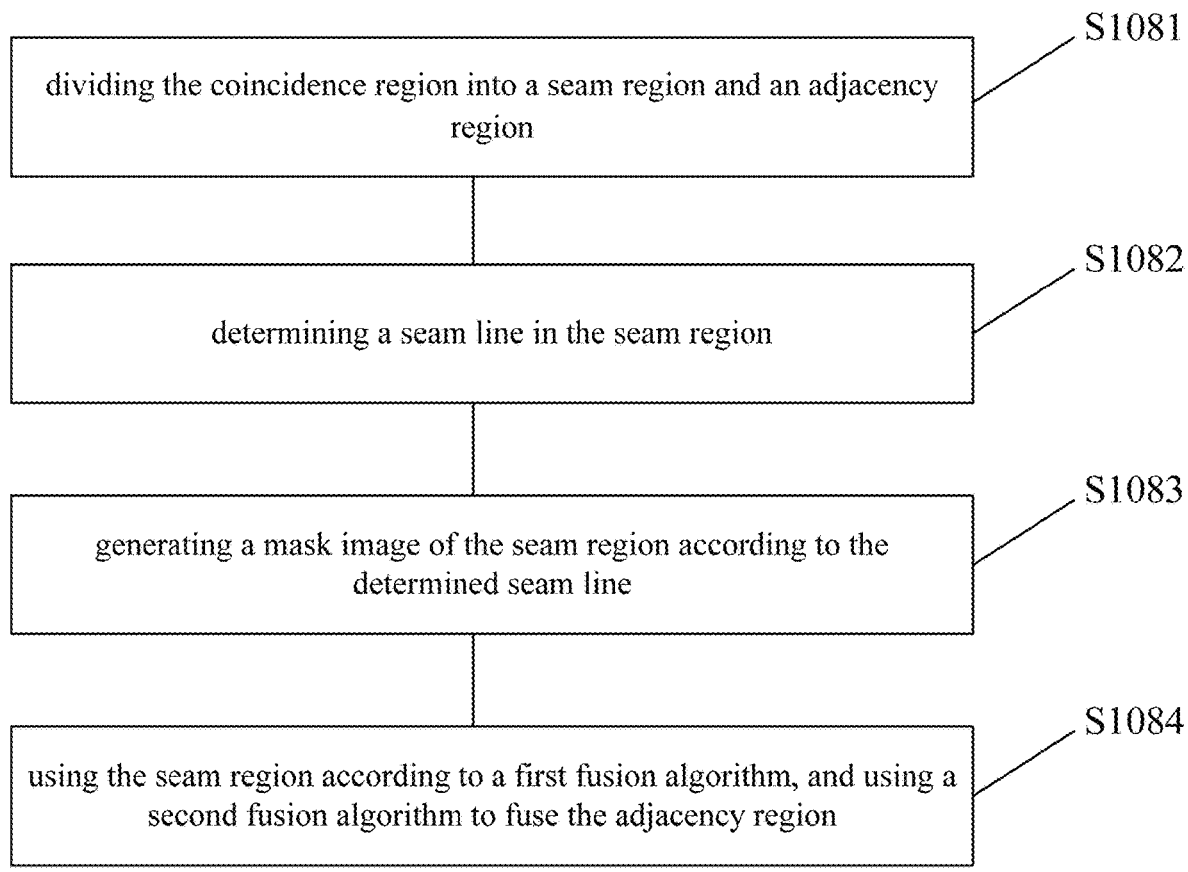
FIG. 4 is a view showing a specific embodiment of processing of virtual detection images in a simulation method for detecting dim environment based on virtual reality of the disclosure.

It should be noted that in the above embodiment, for the combined virtual detection image, seams may occur in the coincidence region and ghosting problems will occur as multiple images are sliced together. In order to solve the technical problem, in the prior art, a seamless combined image is obtained by adjusting the brightness of the combined image to reduce the effect of seams and performing weighted average fusion for the coincidence region. However, in the disclosure, the infrared detection image is not sensitive to visible light, and the image will be distorted by brightness adjustment. Therefore, with reference to FIG. 4, in the disclosure, the combined virtual detection image of each sampling point is further processed by:

Step S1081, dividing the coincidence region into a seam region and an adjacency region;

Step S1082, determining a seam line in the seam region, for example, determining a seam line by optimal seam algorithm;

Step S1083, generating a mask image of the seam region according to the determined seam line;

Step S1084, fusing the seam region generating the mask image according to a first fusion algorithm that is, for example, a multi-resolution image fusion algorithm, and using a second fusion algorithm to fuse the adjacency region; in the present embodiment, the multi-resolution image fusion algorithm is used to fuse the seam region, so that fusion of non-strict coincidence regions may be achieved to eliminate seams for combining into high-quality images, and the second algorithm uses a weighted average image fusion algorithm, which may effectively remove seams in adjacent areas, so the present embodiment may effectively eliminate seams for coincidence regions and avoid ghosting problems on the whole.

In addition, the collected infrared detection images often have clutter noise, etc. If the noise is not removed, inaccurate simulation results will emerge later. As a preferred embodiment, the disclosure further includes preprocessing the collected infrared detection images to remove clutter noise; specifically, for example, the collected infrared detection images are preprocessed to divide the collected infrared detection images into visual saliency tiles and non-visual saliency tiles, and an algorithm that removes noise better is used for visual saliency tiles, such as Non-Local Means (NL-Means) while an algorithm that quickly remove noise for the non-visual saliency tiles, such as the mean filtering algorithm, so that on the one hand noises may be effectively removed for useful information, and on the other hand the denoising efficiency may be improved, which is not repeated here.

The foregoing is only preferred exemplary embodiments of the present invention and is not intended to be limiting of the present invention, and any modifications, equivalent substitutions, improvements and the like within the spirit and principles of the present invention are intended to be embraced by the protection range of the present invention.

What is claimed is:

1. A simulation method for detecting dim environment based on virtual reality, comprising steps of:

determining a detection path based on passage conditions of the detected dim environment;

collecting, by an infrared detector, infrared detection images of front, back, left, and right directions at each sampling point of the detection path;

converting the infrared detection image of each direction collected at respective sampling point to a Difference of Gaussian (DOG) scale-space corresponding to each direction;

detecting a key point of the DOG scale-space of each direction;

establishing a feature vector of the key point according to a position and a reference direction of the key point;

calculating a Euclidean distance between each key point according to respective feature vector of each key point to obtain a matched key point;

determining a coincidence region between infrared detection images of the four directions collected at each sampling point according to the matched key point;

combining infrared detection images of the four directions collected at each sampling point into a virtual detection image of sampling points according to the coincidence region;

converting the virtual detection image of each sampling point into a virtual detection space;

automatically roaming in the virtual detection space to simulate a detection scene.

2. The method of claim 1, further comprising:

determining an automatic roaming path corresponding to the detection path according to the detection path.

3. The method of claim 1, wherein detecting the key point of the DOG scale-space of each direction comprises:

selecting any pixel point in the DOG scale-space as a starting detection point;

using the starting detection point to make a circle with a radius of 3 pixels;

determining a gray difference between the starting detection point and the pixels on a circumference numbered 1, 5, 9 and 13, determining the starting detection point as a candidate key point if a difference between the starting detection point and at least three of 1, 5, 9, and 13 is greater than a preset threshold, and then continuing detection of next detection point until all the pixels are detected to obtain all key points.

4. The method of claim 3, further comprising: screening the candidate key point to remove an edge response point.

5. The method of claim 1, wherein the combined virtual detection image of each sampling point is further processed by:

dividing the coincidence region into a seam region and an adjacency region;

determining a seam line in the seam region;

generating a mask image of the seam region according to the determined seam line;

fusing the seam region according to a first fusion algorithm, and using a second fusion algorithm to fuse the adjacency region.

6. The method of claim 1, further comprising: preprocessing the collected infrared detection images to remove clutter noise.

* * * * *